(12) United States Patent
Griffin

(10) Patent No.: US 12,363,085 B2
(45) Date of Patent: *Jul. 15, 2025

(54) NETWORK DEVICE PROXIMITY-BASED AUTHENTICATION

(71) Applicant: Truist Bank, Charlotte, NC (US)

(72) Inventor: Jeffrey Jason Griffin, Garner, NC (US)

(73) Assignee: Truist Bank, Charlotte, NC (US)

( * ) Notice: Subject to any disclaimer, the term of this patent is extended or adjusted under 35 U.S.C. 154(b) by 70 days.

This patent is subject to a terminal disclaimer.

(21) Appl. No.: 18/517,490

(22) Filed: Nov. 22, 2023

(65) Prior Publication Data

US 2024/0098074 A1    Mar. 21, 2024

Related U.S. Application Data

(63) Continuation of application No. 17/748,732, filed on May 19, 2022, now Pat. No. 11,863,543, which is a
(Continued)

(51) Int. Cl.
*H04L 29/06* (2006.01)
*G06F 21/31* (2013.01)
(Continued)

(52) U.S. Cl.
CPC .......... *H04L 63/0492* (2013.01); *G06F 21/31* (2013.01); *G06F 21/316* (2013.01); *G06F 21/35* (2013.01); *H04L 63/0853* (2013.01); *H04L 63/102* (2013.01); *H04L 63/105* (2013.01); *G06F 21/6245* (2013.01);
(Continued)

(58) Field of Classification Search
CPC ........ G06F 21/31; G06F 21/316; G06F 21/35; G06F 21/6245; G06F 2221/2111; G06F 2221/2137; H04L 63/0492; H04L 63/0853; H04L 63/102; H04L 63/105; H04L 2463/082; H04W 12/06
See application file for complete search history.

(56) References Cited

U.S. PATENT DOCUMENTS 9,075,979 B1    7/2015 Queru
9,451,397 B1*   9/2016 Lee ........................ H04W 8/005
(Continued)

OTHER PUBLICATIONS

Andre Kalamandeen et al., Ensemble: Cooperative Proximity-based Authentication; Jun. 2010, ACM, pp. 331-344. (Year: 2010).*
(Continued)

*Primary Examiner* — Kari L Schmidt
*Assistant Examiner* — Fahimeh Mohammadi
(74) *Attorney, Agent, or Firm* — Kilpatrick Townsend & Stockton LLP; Michael A. Springs, Esq.

(57) ABSTRACT

A wireless system can be used to authenticate a user device via proximity information of wireless network devices. The system can include the user device, the wireless network devices, and a server. At least some of the wireless network devices can be wirelessly connected to the user device and at least some other wireless network devices can be wirelessly unconnected to the user device. The server can use proximity information about the user device with respect to the wireless network devices to authenticate a user.

18 Claims, 5 Drawing Sheets

Related U.S. Application Data continuation of application No. 17/014,085, filed on Sep. 8, 2020, now Pat. No. 11,399,018, which is a continuation of application No. 15/665,925, filed on Aug. 1, 2017, now Pat. No. 10,805,278.

(60) Provisional application No. 62/374,955, filed on Aug. 15, 2016.

(51) Int. Cl.
    *G06F 21/35*     (2013.01)
    *H04L 9/40*     (2022.01)
    *G06F 21/62*     (2013.01)
    *H04W 12/06*     (2021.01)

(52) U.S. Cl.
CPC ................ *G06F 2221/2111* (2013.01); *G06F 2221/2137* (2013.01); *H04L 2463/082* (2013.01); *H04W 12/06* (2013.01)

(56) References Cited

U.S. PATENT DOCUMENTS

| | | | |
|---|---|---|---|
| 10,805,278 B2 | 10/2020 | Griffin | |
| 11,082,839 B2 | 8/2021 | Jacobson et al. | |
| 2007/0021126 A1* | 1/2007 | Nanda | H04W 48/16 455/456.1 |
| 2007/0192349 A1 | 8/2007 | Farr | |
| 2008/0146230 A1* | 6/2008 | Pandian | H04W 36/0016 455/445 |
| 2009/0254975 A1 | 10/2009 | Turnbull | |
| 2009/0264775 A1 | 10/2009 | Wu | |
| 2009/0265775 A1* | 10/2009 | Wisely | H04L 63/0876 380/270 |
| 2011/0059689 A1 | 3/2011 | Haverty | |
| 2011/0154460 A1* | 6/2011 | Khare | H04L 9/3226 726/7 |
| 2012/0208463 A1* | 8/2012 | Causey | G08B 21/0213 455/41.2 |
| 2013/0281118 A1 | 10/2013 | Lipman | |
| 2013/0318581 A1* | 11/2013 | Counterman | H04W 84/12 726/7 |
| 2014/0289827 A1* | 9/2014 | Tang | H04L 63/107 726/6 |
| 2015/0113620 A1* | 4/2015 | Brewer | H04L 63/0853 726/7 |
| 2015/0116320 A1 | 4/2015 | Schwab | |
| 2015/0208226 A1 | 7/2015 | Kuusilinna | |
| 2015/0229650 A1 | 8/2015 | Grigg | |
| 2015/0254465 A1* | 9/2015 | Ekberg | G06F 21/606 726/27 |
| 2015/0281194 A1* | 10/2015 | Elliott | H04W 12/06 726/7 |
| 2017/0048659 A1* | 2/2017 | Silvestri | H04W 4/02 |
| 2018/0048630 A1 | 2/2018 | Griffin | |
| 2018/0062851 A1* | 3/2018 | Cronholm | H04W 12/06 |
| 2018/0316671 A1 | 11/2018 | Brown | |

OTHER PUBLICATIONS

Suhas Mathur et al., ProxiMate: Proximity-based Secure Pairing using Ambient Wireless Signals, Jun. 2011, ACM, pp. 211-224. (Year: 2011).*
Athul Prasad et al., Energy Efficient Device Discovery for Social Cloud Application in 3GPP LTE-Advanced Networks, Jun. 23-26, 2014, IEEE, pp. 1-6. (Year: 2014).*
Liang Xiao et al., Proximity-Based Security Techniques for Mobile Users in Wireless Networks; Oct. 18, 2013, IEEE, vol. 8, Issue 12; pp. 2089-2100. (Year: 2013).*
Andre Kalamandeen et al., Ensemble: Cooperative Proximity-based Authentication; Jun. 2020, ACM, pp. 331-344. (Year 2010).
Athul Prasad et al., Energy Efficient Device Discovery for Social Cloud Applications in 3Gpp LTE-Advanced Networks, Jun. 23-26, 2014, IEEE, pp. 1-6 (Year: 2014).
Mathur, et al., "ProxiMate: Proximity-Based Secure Pairing using Ambient Wireless Signals", Mobisys '11: Proceedings of the 9th International Conference on Mobile Systems, Applications, and Services, Jun. 2011, pp. 211-224.

\* cited by examiner

NETWORK DEVICE PROXIMITY-BASED AUTHENTICATION

CROSS-REFERENCE TO RELATED APPLICATION

This is a continuation of U.S. Non-Provisional application Ser. No. 17/748,732 filed May 19, 2022 and titled "Network Device Proximity-Based Authentication," which is a continuation of U.S. Non-Provisional application Ser. No. 17/014,085 filed Sep. 8, 2020 and titled "Network Device Proximity-Based Authentication," which is a continuation of U.S. Non-Provisional application Ser. No. 15/665,925 filed Aug. 1, 2017 and titled "Network Device Proximity-Based Authentication," which claims priority to U.S. Provisional Patent Application Ser. No. 62/374,955, titled "Network Device Proximity-Based Authentication" and filed Aug. 15, 2016, the entirety of each of which is hereby incorporated herein by reference.

TECHNICAL FIELD

The present disclosure relates generally to wireless telecommunications. More specifically, but not exclusively, aspects of the present disclosure relate to authenticating using telecommunication network information.

BACKGROUND

Providing an electronic network that is secure and that is accessible is important to many organizations. These organizations often devote significant resources to securing the networks and preventing unauthorized access to sensitive information. Authentication systems and procedures that the organizations use provide some level of security, but it still may be possible for unauthorized accesses to sensitive information. One example of an authentication system is a biometric facial recognition system that requires the system to match facial features of a person captured by a camera before allowing the person to access information over a network. But even that type of system may be spoofed through the use of a photograph of the authorized individual. Other types of authentication systems require the user to supply user-known information, such as passwords and answers to security questions. These types of systems also risk unauthorized access by individuals that steal the known information or force authorized uses to reveal the known information used to access sensitive information.

Other types of authentication systems may be less susceptible to allowing unauthorized accesses. These can include time-consuming authentication procedures and other requirements, such as in-person authentication, that can be impractical for accessing sensitive information via an electronic network.

SUMMARY

In one example, an authentication server includes a network communications port, a processor device, and a non-transitory computer-readable medium. The network communications port can receive packetized data from a telecommunications network. The packetized data includes proximity information about wireless network devices in an environment of a user device. The non-transitory computer-readable medium includes that are executable by the processor device to: extract, from the packetized data, the proximity information about wireless network devices in the environment of the user device remotely located to the authentication server; compare the proximity information to stored data about wireless network devices in proximity to the user device during a set-up phase; and use the comparison of the proximity information to the stored data to authenticate a user of the user device.

In another example, a wireless system includes a user device, wireless network devices, and a server. At least some of the wireless network devices are configured for wirelessly connecting to the user device and at least some other wireless network devices are configured for being wirelessly unconnected to the user device. The server is configured for using proximity information about the user device with respect to the plurality of wireless network devices to authenticate a user.

In another example, a method includes an authentication server receiving data from a telecommunications network. The data includes proximity information about wireless network devices in an environment of a user device remotely located to the authentication server. A processor device of the authentication server extracts, from the data, the proximity information about wireless network devices in the environment of the user device. The processor devices compares the proximity information to stored data about wireless network devices in proximity to the user device during a set-up phase. A second-factor authentication processor is performed for a user of the user device using the comparison of the proximity information to the stored data.

DETAILED DESCRIPTION

Figure 1:
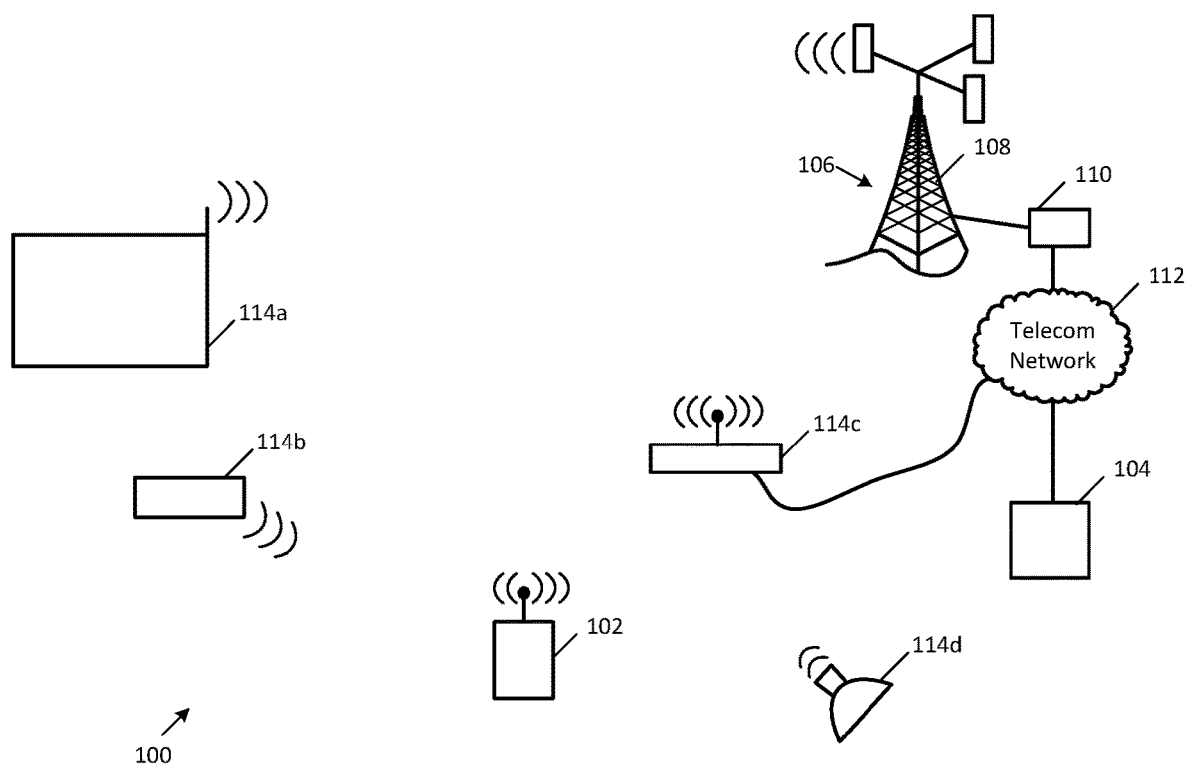
FIG. 1 is a schematic diagram of an environment for using network device proximity information for authenticating a user according to one example.

Certain aspects and features of the present disclosure relate to authenticating a user using information about devices that are in proximity to a user device controlled by the user. Information about connected devices to which the user device is wirelessly connected and about network devices that are in an environment around the user device, but are not wirelessly connected to the user device, can be used to authenticate that the user is who the user purports to be. Authenticating the user by proximity information can also be used in a second-factor authentication process to authenticate the user. In this manner, a user can be authenticated not solely on information known to the user, or supplied directly from the user, but using information in an environment of the user that is difficult to replicate for purposes of spoofing an authentication system.

Authentication processes can be susceptible to being compromised. Additional authentication processes may be needed to prevent fraud or "faking" conditions to work around other authentication processes. Proximity information from a user device can be much more difficult to fake because it is focused on the environment of the user, rather than a controllable attribute of the user or the user device. The environment of the user can include the environment at a particular point in time (such as when the user makes a request to access sensitive information), or the environment can include the environment at the current time and historical information. For example, the proximity information can include a list of devices known to the user device. The known devices can include WiFi access points that are remembered by the user device, in addition to previously paired (but not currently present) devices that communicatively coupled to the user device via Bluetooth. Using proximity information to authenticate a user can not only improve authentication processes, but can also improve and enhance secured wireless communication over a wireless network.

Proximity information for the user device can include information about the relative position of the user device with respect to a set of other devices, rather than necessarily an absolute location of the user device. That is, the proximity information can include the wireless communication devices or systems that are within range for communication with the user device (whether or not the user device is wirelessly connected to the devices or systems) to represent the relative position of the user device. The absolute location of the user device (e.g., GPS coordinates, address, etc.) may not be necessary because it is the proximity of the user device relative to other network devices, regardless of whether the absolute location of that environment happens to change. For example, if the user moves residences, but maintains the same networking equipment and devices in the new residence as in the old residence, the proximity of the user devices can still be used to authenticate a user.

User devices can be network devices that may be communicating wirelessly or via wired connection to a network. For examples, the network devices can communicate via the IEEE 802.1x standard for networking protocols using a local-area network (LAN) or a wireless local-area network (WLAN) connection. The network devices may also or alternatively communicate via a short-range wireless communication standard, such as Bluetooth. These network devices may transmit a hardware ID or a network ID and be identifiable via those IDs or via a network name. An authentication system according to some examples may authenticate a user device using information from the network devices without authenticating the network devices or otherwise establishing a network communication link with the network devices.

These illustrative examples are given to introduce the reader to the general subject matter discussed here and are not intended to limit the scope of the disclosed concepts. The following sections describe various additional features and examples with reference to the drawings in which like numerals indicate like elements.

FIG. 1 depicts an example of an environment 100 in which a proximity-based authentication process according to some examples can be used. The environment 100 includes a user device 102 that can be controlled by a user that is seeking to authenticate herself or himself to access data on a server 104. Examples of the user device 102 include a "smart" phone, a tablet, a personal computer, a personal digital assistant, and a wearable tech device. The user device 102 can communicate with the server 104 over a cellular network 106 that includes a cellular tower 108 and a base transceiver station 110, and through a telecommunications network 112, which may be or include a mobile telephone switching office. In other examples, the user device 102 can communicate with the server 104 through an Internet Protocol (IP) network through one or more wireless IP network devices and the telecommunications network 112.

The user device 102 can be in a wireless range of one or more other wireless-enabled network devices 114a-d. The network devices 114a-d can communicate wirelessly via one or more wireless technology approaches, such as WiFi and Bluetooth. The user device 102 may be wirelessly connected (e.g., exchanging data and having the permission to use and access data) to some but not all of the network devices 114a-d. For example, the user device 102 can be wirelessly connected to network devices 114a-b and 114d, but not to network device 114c. Even though the user device 102 is not connected to network device 114c, network device 114c can be part of the devices to which the user device 102 is in proximity and the user device 102 can receive signals transmitted by the network device 114c. Information about the network devices 114a-d can be used as proximity information for the user device 102 that can be used by the server 104 to authenticate the user via the user device 102. Information about the proximity of the user device 100 to the cellular network 106 can also be used.

Figure 2:
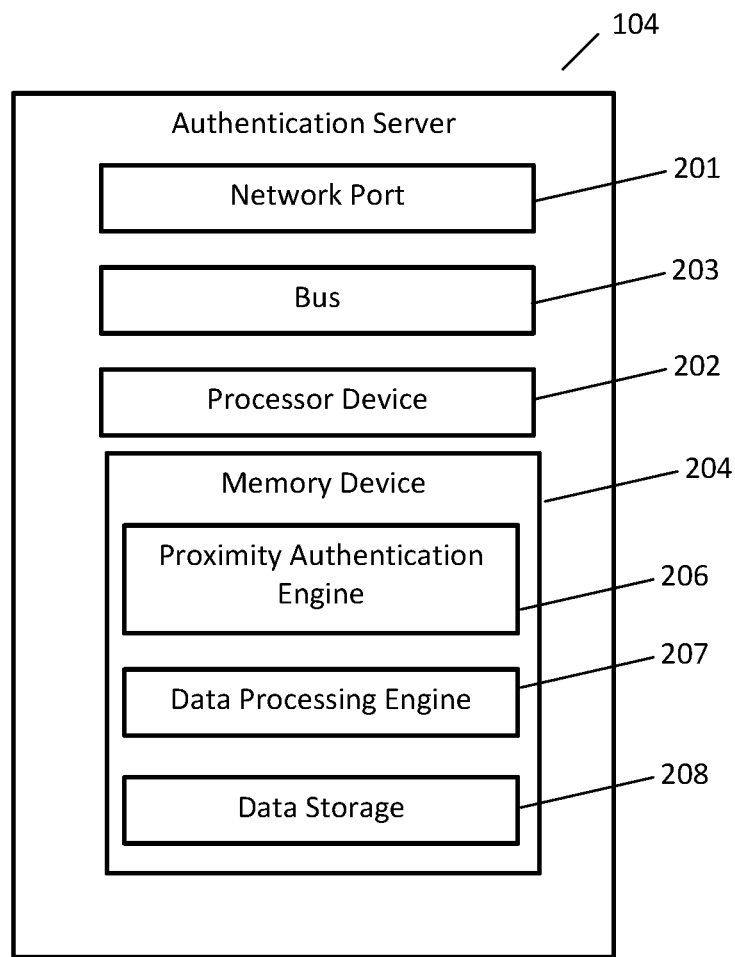
FIG. 2 is a block diagram of an authentication server according to one example.

FIG. 2 depicts an example in block diagram form of the server 104 according to one example. The server 104 includes a network port 201, a bus 203, processor device 202, and a memory device 204. The network port 201 may be a network communications port associated with an IP address of the server 104 and represents a network address of the server 104. The network port 201 can implement a communication protocol for exchanging information with network devices and other systems. For example, the network port 201 can receive packetized data from a user device. The packetized data includes identifiers for or represents the wireless network devices that are in proximity to the user device (or vice versa). The bus 203 can transport data and information among components of the server 104 within the server.

The processor device 202 can be, or can include, any device that can execute instructions to cause the server 104 to perform actions. Examples of the processor device 202 can include a microprocessor, a digital signal processor, and an ASIC. Instructions can be stored in the memory device 204. The memory device 204 can be, or include, any non-transitory computer-readable medium for storing data and instructions. Examples of the memory device 204 include optical storage device, magnetic storage devices, DRAM, RAM, and flash memory devices. The instructions can include a proximity authentication engine 206 that can be executed by the processor device 202 to use proximity information about a user device to authenticate a user associated with the user device. The memory device 204 can also store other types of data, such as user profile data in data storage 208. And the memory device 204 can include other applications, such as a data processing engine 207, which can be executed to perform other actions, such as extracting proximity information from packetized data.

Although a server 104 is depicted in FIGS. 1-2, other types of devices can be used. For example, the server 104 can be replaced with a desktop or laptop computer, or another processor-based device that can perform proximity-based authentication.

Figure 3:
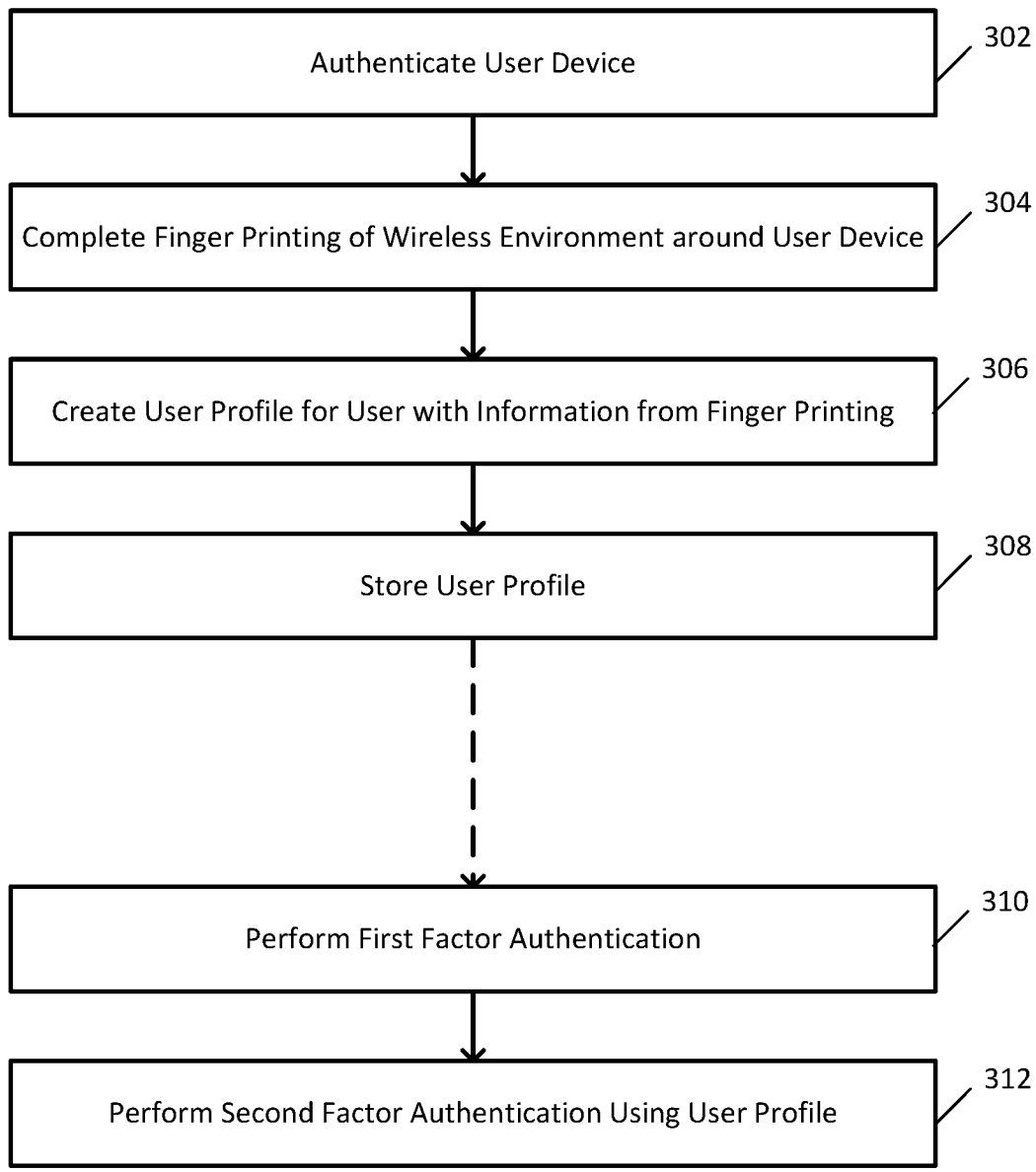
FIG. 3 is a flow chart of a process for performing second factor authentication using proximity information according to one example.

FIG. 3 is a flow chart of a process for performing second factor authentication using proximity information. The process shown in FIG. 3 can be performed by the server 104 of FIGS. 1-2, or by another device or system.

In block 302, the user device or user is authenticated. The process to authenticate the user device or user can be one that has a relatively high confidence of authentication, but that is typically not convenient or possible to perform each time that a user attempts to access data, particularly wirelessly from a wireless device. For example, the process can involve many different authentication processes—e.g., username and password, biometric validation, voice validation, absolute location confirmation, out-of-band authentication processes, out-of-wallet and in-wallet question and answer exchanges, etc.—or it can involve live authentication in which the user is authenticated by another person.

Figure 4:
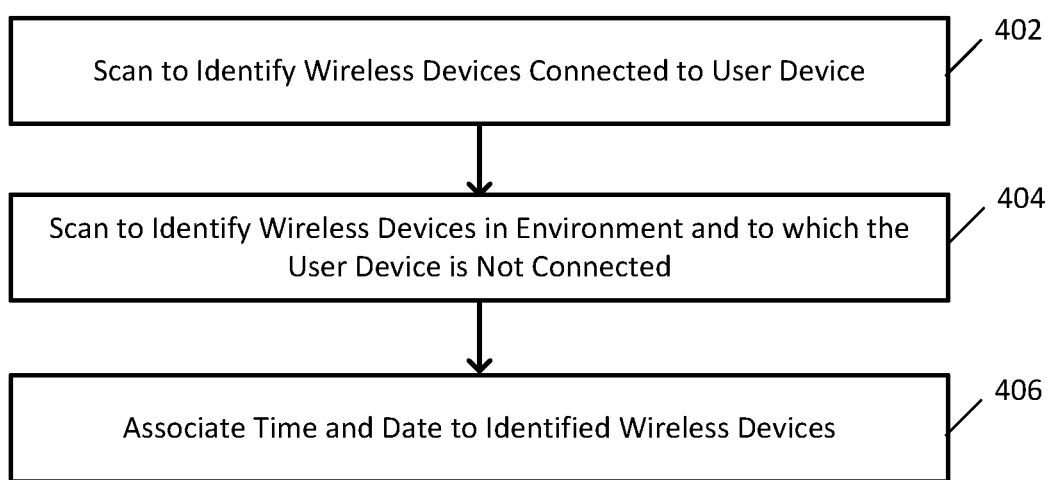
FIG. 4 is a flow chart of an example of a process for assessing the wireless environment around the user device for purposes of authentication according to one example.

In block 304, "finger printing" is completed for the wireless environment around the user device. "Finger printing" can be performed in a set-up phase. For example, a server can cause the user device to scan for wireless network devices to which the user device is connected or that is in range of the user device. The server can receive proximity information about each of these wireless network devices and combine this proximity information with a date and time of the scan to form a "finger print" for the user device. FIG. 4 is a flow chart of an example of a process for completing the "finger printing" of the wireless environment around the user device of block 304.

In block 402, the user device conducts a scan to identify wireless (or network) devices connected to the user device and transmits information about the identified wireless devices to the server. In some examples, the user device contains the information and sends the information to the server in response to a request from the server. In other examples, the server transmits a command to the user device to conduct the scan.

In block 404, the user device conducts a scan to identify wireless (or network) devices in the environment and to which the user device is not connected. The user device transmits information about the identified, unconnected wireless devices to the server. Unconnected wireless devices can include wireless devices that the user device can wirelessly detect, but to which the user device is not communicating data, other than perhaps an identifier or similar information about the user device's presence in the environment. In some examples, the scans of blocks 402 and 404 can be performed in one process or in multiple processes.

In block 406, the server can associate the time and date to identified wireless devices, whether connected or unconnected wireless devices, and store the information and association in a memory device.

Returning to FIG. 3, in block 306, a user profile is created for the user with the information from the "finger print." The user profile can associate the proximity information and date and time information with an account for the user.

In block 308, the user profile is stored. For example, the user profile can be stored in memory for subsequent access and use by the server or other computing device. In other examples, the user profile is distributively stored across multiple computer storage devices located in various locations, or virtually in a cloud environment.

This may complete a "finger printing" phase by which the user profile is created for use in subsequently authenticating the user with proximity information in a second factor authentication process. For example, the user, at a later time, may use the user device to access secured data or services over a network. Before the user can access the secured data or services, the user can be authenticated.

For example, in block 310, a first factor authentication process can be performed. For example, the system can receive a user name and password from the user device and compare that information to stored information. The user can be authenticated when the information matches the stored information.

In block 312, the system performs a second factor authentication process using the user profile and proximity information received from the user device contemporaneously with performing the second factor authentication. The proximity information can be received from the user device again, in addition and subsequent to proximity information received during the "finger printing" phase, and used with the user profile to authenticate the user. The proximity information can include network devices to which the user device is wirelessly connected and that are in range with the user device but that are not wirelessly connected to the user device.

Figure 5:
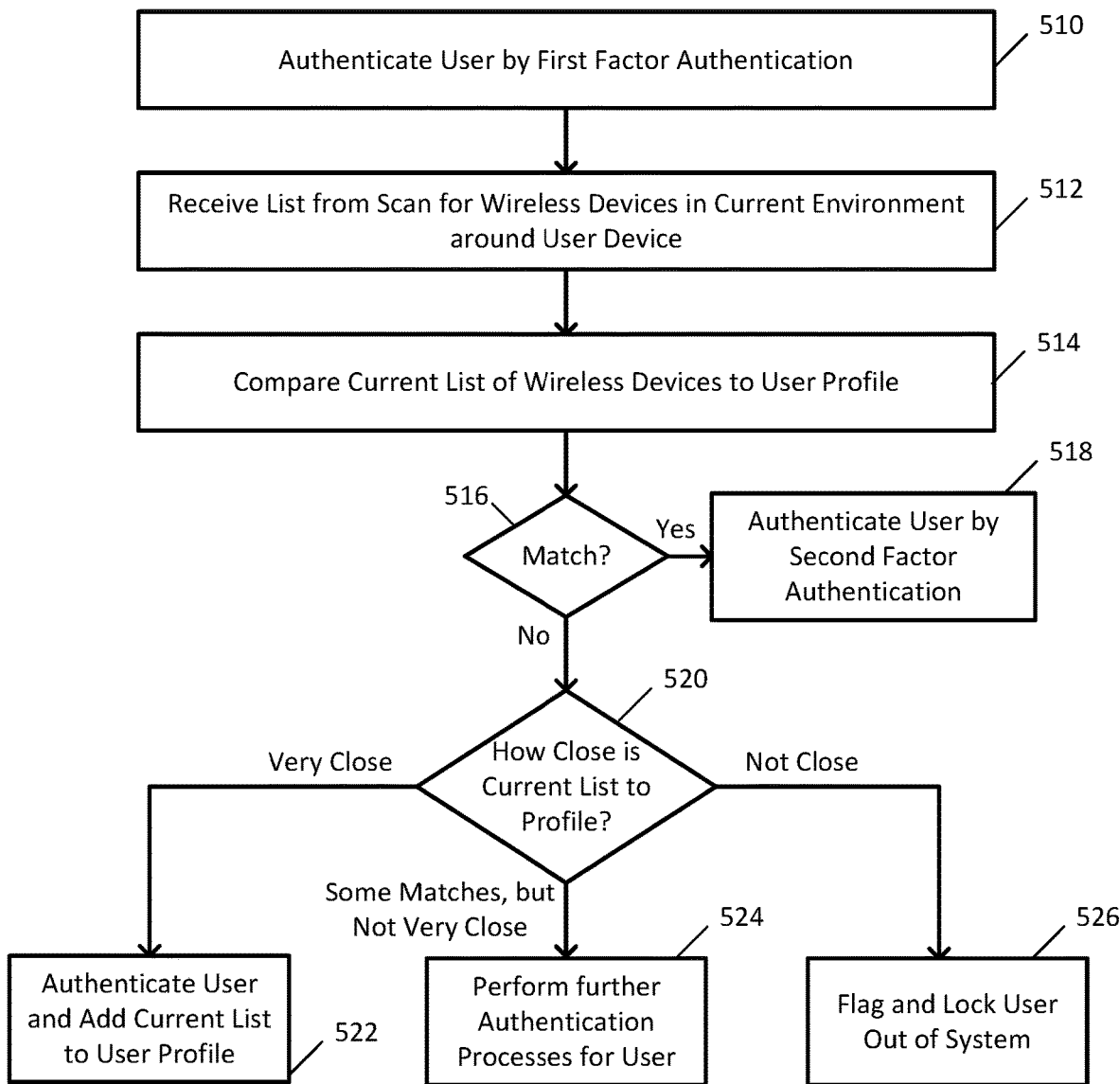
FIG. 5 is a flow chart of an example of a process for authenticating a user subsequent to creating a user profile according to one example.

FIG. 5 is a flow chart of an example of a process for authenticating a user subsequent to creating a user profile through a "finger printing" process. In block 510, the server can authenticate the user by a first factor authentication process, such as those described with reference to block 310 of FIG. 3.

In block 512, the server can receive list of wireless devices from a scan for wireless devices in a current environment around the user device. The wireless devices can be devices, networks, or systems with which the user device is wirelessly connected or that are within a range of the user device. The list of wireless devices can include various types of proximity information about the wireless devices in the current environment of the user devices. Examples of the types of information in the list include service set identifier (SSID), media access control (MAC) address or network address, channel information, device name, universally unique identifier (UUID), profile type (e.g., the function of the wireless device), and signal strength. Other types of information in the list can include information about cellular devices. Examples of this type of information include country, network, and tower identifier.

In block 514, the server compares the current list of wireless devices in an environment around the user device to the user profile. The server can compare some, but not all of, the information about each wireless device in the current list of wireless devices. In other examples, the server compares all of the information about each wireless device to information in the user profile.

In block 516, the server determines whether the current list of wireless devices matches the user profile. If the current list is an exact match to the information in the user profile, or if all of the information in the current list is included in the user profile, the server authenticates the user in block 518.

If the current list is not an exact match to the information in the user profile, the server determines how close the current list is to the information in the user profile in block 520. The closeness of the current list to the information can be assessed as an amount within a range. For example, the closeness can range from very close (e.g., one, two, or very few wireless devices do not match) to not close (e.g., no wireless devices match or only one or two devices match). Within this range can be one or more intermediate amounts, such as there being some (e.g., more than two) matches between the information and the user profile, but not any (or many) more matches.

In block 522, the server can authenticate the user and add information from the current list to the user profile in response to determine a very close match. The updated user profile can be stored in memory.

In block 524, the server can perform further authentication processes for the user in response to determining that some of the information matches, but is not very close. These authentication processes may involve more user input than a more automatic authentication process as may be possible with a very close match. Examples of these authentication processes can include out-of-band authentication processes, out-of-wallet and in-wallet questions, and other types of authentication processes.

In block 526, the server can flag the user profile and lock the user out of the system to prevent the user from accessing data from the system in response to determining that the information is not close to matching the user profile.

Using certain aspects and features of the present disclosure, a user can be authenticated at a relatively high confidence, not based on information directly from the user, but rather information about wireless devices in an environment in which the user is located. This type of authentication process can be more difficult to trick to cause false authentication and promote fraud. The process can be user-device independent in that information about a particular user device is not necessary for authentication. Rather, if the user obtains a new user device, the user device can scan and identify the same or similar wireless devices in the environment and the authentication process can occur independent of the specific user device used. Although described in conjunction with a second factor authentication process, certain aspects of a proximity-based authentication process can be used as a first factor authentication process, or a sole authentication process.

In some examples, a date and time associated with the information in the user profile can be used with a date and time associated with information about network devices in the environment at a current time in authenticating the user. For example, if the date associated with the information in the user profile was a non-holiday weekday and the current date is a holiday or a weekend, the information in the user profile to the list of network networks may not need to be as close for the user to be authenticated.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A system comprising:
one or more processor devices; and
a non-transitory computer-readable medium comprising instructions that are executable by the one or more processor devices for causing the one or more processor devices to:
receive first proximity information from a user device of a user, the first proximity information indicating a first set of wireless network devices in a wireless range of the user device on a first date;
generate a fingerprint for the user based on the first proximity information;
store the fingerprint in memory; and
after storing the fingerprint in the memory:
receive second proximity information from the user device of the user, the second proximity information indicating a second set of wireless network devices in wireless range of the user device on a second date that is subsequent to the first date;
retrieve the first proximity information from the fingerprint in the memory;
determine a level of closeness between the first proximity information and the second proximity information;
determine a first characteristic of the first date and a second characteristic of the second date;
determine a difference between the first characteristic and the second characteristic;
adjust an authentication process for granting the user access to sensitive information based on the difference between the first characteristic and the second characteristic; and
determine whether to grant the user access to the sensitive information based on the level of closeness and the difference.

2. The system of claim 1, wherein the first characteristic is that the first date is a non-holiday weekday.

3. The system of claim 1, wherein the second characteristic is that the second date is a holiday.

4. The system of claim 1, wherein the second characteristic is that the second date is a weekend day.

5. The system of claim 1, wherein the non-transitory computer-readable medium further comprises instructions that are executable by the one or more processor devices for causing the one or more processor devices to:
relax the authentication process for granting the user access to the sensitive information based on the difference between the first characteristic and the second characteristic.

6. The system of claim 1, wherein the first characteristic includes a first time associated with the first proximity information on the first date, the second characteristic includes a second time associated with the second proximity information on the second date, and the difference is a time difference between the first time and the second time.

7. A method comprising:
receiving, by one or more processor devices, first proximity information from a user device of a user, the first proximity information indicating a first set of wireless network devices in a wireless range of the user device on a first date;
generating, by the one or more processor devices, a fingerprint for the user based on the first proximity information;
storing, by the one or more processor devices, the fingerprint in memory; and
after storing the fingerprint in the memory:
receiving, by the one or more processor devices, second proximity information from the user device of the user, the second proximity information indicating a second set of wireless network devices in wireless range of the user device on a second date that is subsequent to the first date;
retrieving, by the one or more processor devices, the first proximity information from the fingerprint in the memory;
determining, by the one or more processor devices, a level of closeness between the first proximity information and the second proximity information;
determining, by the one or more processor devices, a first characteristic of the first date and a second characteristic of the second date;

determining, by the one or more processor devices, a difference between the first characteristic and the second characteristic;

adjusting, by the one or more processor devices, an authentication process for granting the user access to sensitive information based on the difference between the first characteristic and the second characteristic; and determining, by the one or more processor devices, whether to grant the user access to the sensitive information based on the level of closeness and the difference.

8. The method of claim 7, wherein the first characteristic is that the first date is a non-holiday weekday.

9. The method of claim 7, wherein the second characteristic is that the second date is a holiday.

10. The method of claim 7, wherein the second characteristic is that the second date is a weekend day.

11. The method of claim 7, further comprising:
relaxing the authentication process for granting the user access to the sensitive information based on the difference between the first characteristic and the second characteristic.

12. The method of claim 7, wherein the first characteristic includes a first time associated with the first proximity information on the first date, the second characteristic includes a second time associated with the second proximity information on the second date, and the difference is a time difference between the first time and the second time.

13. A non-transitory computer-readable medium comprising instructions that are executable by one or more processor devices for causing the one or more processor devices to:
receive first proximity information from a user device of a user, the first proximity information indicating a first set of wireless network devices in a wireless range of the user device on a first date;
generate a fingerprint for the user based on the first proximity information;
store the fingerprint in memory; and
after storing the fingerprint in the memory:
receive second proximity information from the user device of the user, the second proximity information indicating a second set of wireless network devices in wireless range of the user device on a second date that is subsequent to the first date;
retrieve the first proximity information from the fingerprint in the memory;
determine a level of closeness between the first proximity information and the second proximity information;
determine a first characteristic of the first date and a second characteristic of the second date;
determine a difference between the first characteristic and the second characteristic; and
determine whether to grant the user access to sensitive information based on the level of closeness and the difference at least in part by adjusting an authentication process for granting the user access to the sensitive information based on the difference between the first characteristic and the second characteristic.

14. The non-transitory computer-readable medium of claim 13, wherein the first characteristic is that the first date is a non-holiday weekday.

15. The non-transitory computer-readable medium of claim 13, wherein the second characteristic is that the second date is a holiday.

16. The non-transitory computer-readable medium of claim 13, wherein the second characteristic is that the second date is a weekend day.

17. The non-transitory computer-readable medium of claim 13, further comprising program code that is executable by the one or more processor devices for causing the one or more processor devices to:
relax the authentication process for granting the user access to the sensitive information based on the difference between the first characteristic and the second characteristic.

18. The non-transitory computer-readable medium of claim 13, wherein the first characteristic includes a first time associated with the first proximity information on the first date, the second characteristic includes a second time associated with the second proximity information on the second date, and the difference is a time difference between the first time and the second time.

* * * * *